Aug. 14, 1956  J. C. WRENN  2,759,180
GATE CIRCUITS
Filed May 3, 1952
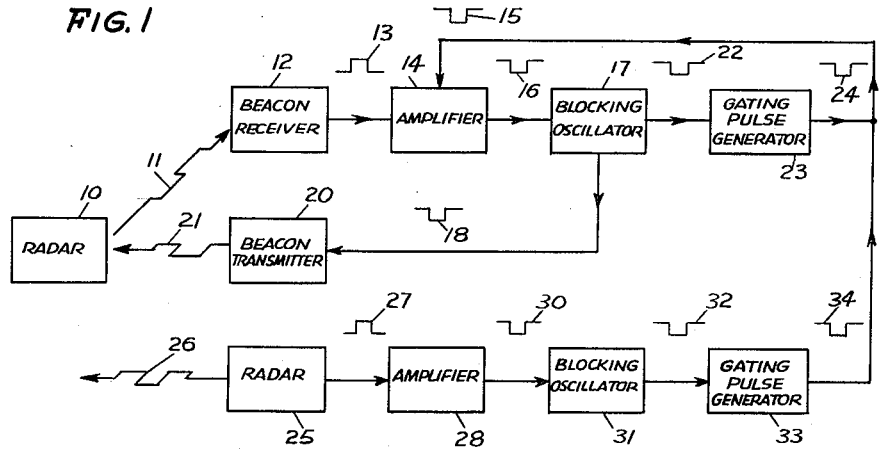
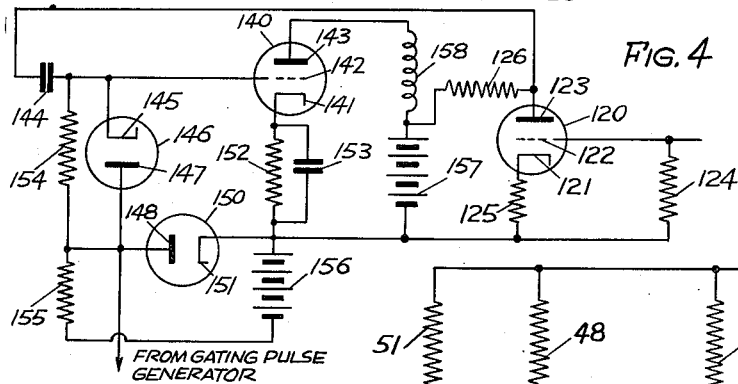
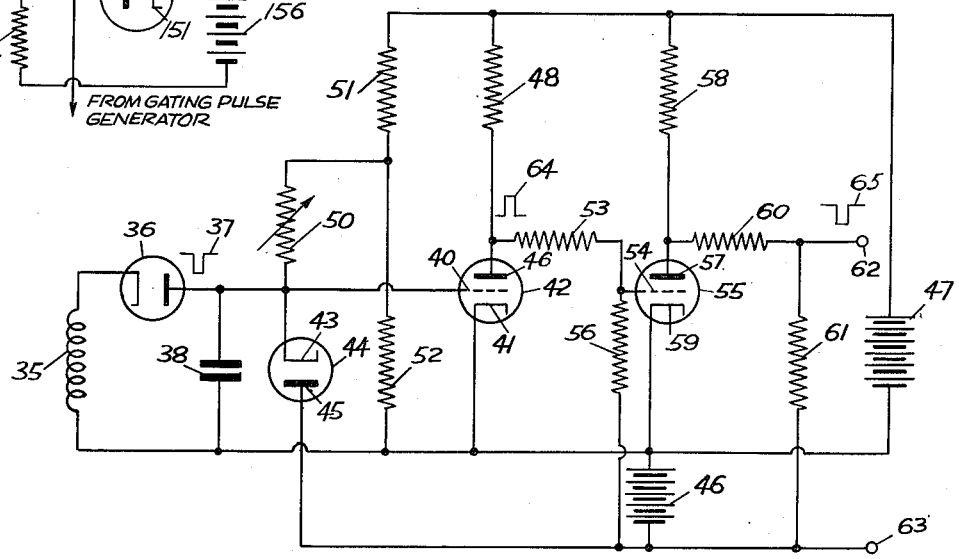
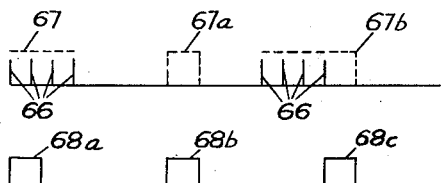
FIG. 3a
FIG. 3b
INVENTOR
JOHN C. WRENN
BY Elmer J. Gorn
ATTORNEY

United States Patent Office 2,759,180
Patented Aug. 14, 1956

2,759,180

GATE CIRCUITS

John C. Wrenn, Newton, Mass., assignor to Raytheon Manufacturing Company, Newton, Mass., a corporation of Delaware Application May 3, 1952, Serial No. 285,935

2 Claims. (Cl. 343—5)

This invention relates to beacon systems, and more particularly to a circuit for producing a negative pulse when a signal is received by the beacon receiver or a pulse is emitted by an associated radar set, and means to utilize either of these negative pulses to block the appearance of an actuating pulse at the beacon transmitter.

In radar beacon systems, it is desirable that, after the beacon has been interrogated by a signal, it shall ignore other signals until the reply to the first signal has been completed. It is also desirable that the beacon shall be rendered inoperative or suppressed for a variable period of time after a pulse has been emitted from a nearby radar set emitting signals within the frequency band of the beacon system. The purpose of this requirement is to prevent the beacon from sending needless replies to radar sets in the neighborhood of the beacon.

In order to allow the beacon to reply to as many signals as possible without overloading the transmitter, the "dead time" of the beacon or the time that the beacon is suppressed must be held to very tight limits. The "dead time" required to prevent undesired responses to the signals of nearby associated radar sets in a representative system varies from five to two hundred microseconds, and the equipment must be capable of initiating a new suppression cycle within five microseconds after the expiration of the previous suppression cycle. It is also desirable that the suppression time should be lengthened when a second suppression pulse is received from a nearby radar before the suppression cycle instituted by a previous suppression pulse has been completed.

The foregoing is accomplished in the present invention by generating a negative suppression pulse in response to the receipt of a properly coded signal by the beacon receiver and using this pulse to prevent a pulse from appearing at the beacon transmitted to initiate a response until the response to the first signal has been completed. In addition a second suppression pulse is derived from an associated radar when it emits a signal to prevent a pulse reaching the transmitter to initiate a response until a predetermined time after the radar has emitted a signal. In the system of the invention, upon receipt of a properly coded signal, the beacon receiver produces a pulse that is amplified in a gated amplifier. The output of the amplifier triggers a blocking oscillator to produce a pulse used to trigger the beacon transmitter into response and also is applied after rectification to the input of a two-stage amplifier across a capacitor. The capacitor is shunted by a second rectifier biased negatively to limit the negative charge on the capacitor. The first stage is normally conducting and cuts off upon receipt of a negative pulse. The capacitor discharges through two resistors. The time constant of this circuit determines the duration of the resulting positive pulse that is inverted in the second stage and applied to the gated amplifier to disable it for the duration of the pulse. A similar circuit receives a pulse from an associated radar and produces a negative pulse that is also applied to the gated amplifier to prevent the triggering of the beacon transmitter.

Other and further objects and advantages of this invention will be apparent as the description thereof progresses, reference being had to the accompanying drawings, wherein:

Fig. 1 is a block diagram of a beacon system embodying the invention;

Fig. 2 is a schematic diagram of a gating pulse generator circuit embodying the invention;

Fig. 3a is a time diagram showing the relationship of the gated output of the beacon transmitter to the suppression pulse produced by the circuit of Fig. 2;

Fig. 3b is a time diagram on the same time scale as Fig. 3a showing the relationship of the suppression pulse due to the associated radar to the suppression pulse due to the beacon receiver; and Fig. 4 is a schematic diagram of the gated amplifier shown in Fig. 1.

In Fig. 1, the reference numeral 10 designates an interrogating signal represented by the jagged line 11. This signal is received by the beacon receiver 12, and, if the signal is of the predetermined code, a positive pulse represented by the wave form 13 is produced by the receiver. The receiver 12 can be of any of the well-known types of beacon receivers. Its output is amplified by a gated amplifier 14, the circuit of which will be described later. This amplifier is disabled by the application of a negative pulse, represented by the wave form 15 produced in a manner to be explained later. The output of the amplifier 14, represented by the wave form 16, triggers a blocking oscillator 17 of any of the well-known types. Part of the output of the oscillator 17, represented by the wave form 18, is applied to the beacon transmitter 20 to cause it to emit a signal represented by the jagged line 21 toward the radar 10. Another part of the output of the blocking oscillator 17, in the form of a negative pulse represented by the wave form 22, is applied to a gating pulse generator 23, that will be described later, to produce a negative pulse represented by the wave form 24. This pulse is applied to the gated amplifier 14, as mentioned above. An associated radar set 25, when it emits a signal represented by the jagged line 26, also produces a pulse represented by the wave form 27 that is transmitted over a cable or other communications link to an amplifier 28 that produces a negative pulse represented by the wave form 30 that is used to trigger a blocking oscillator 31. This oscillator produces a negative pulse represented by the wave form 32 which is applied to a second gating pulse generator circuit 33 of the same type as the generator 23. This circuit produces a second negative pulse represented by the wave form 34 that is also applied to the gated amplifier 14.

The circuit of these gating pulse generators 23 and 33 is shown in Fig. 2. A portion of the output of the blocking oscillator 17 or 31 is taken off by means of a winding 35 and rectified by a rectifier 36 to give a negative pulse represented by the wave form 37. This pulse places a negative charge on a capacitor 38 connected across the rectifier 36 and the winding 35. This capacitor 38 is connected between the grid 40 and the cathode 41 of a vacuum tube 42. The cathode 43 of a second rectifier 44 is connected to the grid 40, and the plate 45 of the rectifier 44 is connected through a source of negative potential 46 to the cathode 41 of the tube 42. The plate 46 of the tube 42 is connected to a source 47 of positive potential through a resistor 48. The grid 40 of this tube is connected through a variable resistor 50 and a fixed resistor 51 to the source 47 of positive potential. Another fixed resistor 52 is connected between the junction of resistors 50 and 51 and the cathode 41 of the tube 42. The plate 46 of the tube 42 is connected through a resistor 53 to the grid 54 of a second tube 55. The grid 54 is also connected to the source 46 of negative potential through a resistor 56. The plate 57 of this tube is connected to the source 47 of positive potential through a resistor 58 and also to the cathode 59 through resistors 60 and 61 and the source 46 of negative potential. Output terminals 62 and 63 are connected one to each end of the resistor 61.

In operation, when a negative pulse is produced by the blocking oscillator 17, and rectified by the rectifier 36, it produces a negative charge on the capacitor 38. The rectifier 44 is biased by the source 46 so that, if the negative charge on the capacitor 38 exceeds a predetermined value, the capacitor is rapidly discharged to this predetermined value. Before the appearance of such a negative pulse, the grid 40 of the tube 42 is at a positive potential determined by the positive potential supplied by the source 47, and the value of the resistors 50 and 51. Thus, the tube 42 conducts when the voltages are applied and before a negative pulse 37 appears at the grid 40. When such a pulse appears, the tube is cut off and a positive pulse represented by the wave form 64 appears at the plate 46. The charge on the capacitor 38 leaks off through resistors 50 and 52. The resistance of this circuit, together with the capacity of capacitor 38 and the value of the applied negative potential, determines the duration of the positive pulse 64. This pulse is applied to the grid 54 of the tube 55 and appears as a negative pulse represented by the wave form 65 at the output terminals 62 and 63.

The circuit of the amplifier 14 is shown in Fig. 4, together with the output stage of the receiver 12. This stage comprises a tube 120 having a cathode 121, a grid 122 and a plate 123. The grid is coupled to the preceding stage from which it receives a negative-going pulse when a properly coded signal is applied to the receiver. The grid 122 is connected to the cathode 121 through resistors 124 and 125. The plate 123 is connected to the source 157 of positive potential through a resistor 126 and is coupled to the amplifier 14. The amplifier 14 comprises a tube 140 having a cathode 141, a control grid 142 and a plate 143. The control grid 142 is coupled to the beacon receiver 12 through a capacitor 144 and to the cathode 145 of a diode 146, the plate 147 of which is connected to the plate 148 of a second diode 150, the cathode 151 of which is connected to the cathode 141 of the triode through a resistor 152 shunted by a capacitor 153. A resistor 154 is connected across a diode 146. A resistor 155 and a source of negative potential 156 are connected in series across the diode 150. The plates 147 and 148 of the diodes 146 and 150 are connected to the output of the gating generator shown in Fig. 2. The plate voltage for the triode 140 is obtained from a source 157 of positive potential through a winding 158 of the blocking oscillator 17.

In operation, when a negative pulse caused by the appearance of a properly coded signal at the receiver appears at the grid 122 of the tube 120, the normally conducting tube 120 ceases conducting and the potential of the plate 123 rises to the potential of the source 157 to produce a positive-going pulse 13 at the grid 142 of the amplifier tube 140. When this pulse 13 from the receiver 12 appears at the grid 142 of the amplifier tube 140 in the absence of a suppression pulse 15, the signal 13 will overcome the normally negative bias from the source 156, and the tube 140 conducts, producing a negative signal 16. This signal, as described above, when applied to the blocking oscillator 17, produces a negative pulse 22 that is applied to the gating pulse generator 23 to produce a negative pulse 24 that, when applied to the grid 142 through the resistor 154, adds to the negative bias from the source 156 to prevent the tube 140 conducting even in the presence of a signal pulse 13.

In the absence of either type of signal but with the operating potentials applied, the potential at the plate 123 of the tube 120 appears on one side of the capacitor 144 and the negative potential of the source 156 appears at the other side of the capacitor 144. When a signal pulse appears, the potential on the receiver side of the capacitor 144 increases, placing a charge on the capacitor and producing a negative pulse in the output of the amplifier 14. When the pulse ceases, the capacitor 144 discharges through resistor 154, the diode 150 and the tube 120 now conducting. The presence of the diode provides a low impedance discharge path, permitting rapid discharge at the end of a signal pulse. This rapid discharge of any remaining positive charge on the capacitor permits a succeeding negative pulse to have its effect immediately without first having to overcome such a charge. With the capacitor returned to its normal condition, if a negative-going pulse is applied, the potential on the amplifier side of the capacitor 144 increases in the negative direction sufficiently to prevent the tube 140 conducting even in the presence of a signal from the receiver. When this negative pulse ceases, the capacitor 144 discharges through the diode 146 and the output of the source of gating pulses, shown in Fig. 2, to return the circuit to its initial condition.

In Fig. 3a, the pulse group that the beacon transmitter 20 emits upon receiving a pulse 18 is represented by the vertical lines 66. Thus, to permit these pulses to be transmitted undisturbed, the amplifier 14 must be disabled for the interval indicated by the dotted lines 67. In Fig. 3b, the pulses emitted by the radar 25 whenever it emits a signal are represented by the wave forms 68a, 68b, and 68c drawn to the same time scale as the pulses in Fig. 3a. Wave form 68a represents a pulse that may be produced at a time when the amplifier is already disabled by the presence of a pulse 67 originating in the beacon receiver. The wave form 68b represents a pulse that arrives at a time when the amplifier 14 would otherwise be in an operative condition but, due to the pulse 34 generated in the generator 33, the amplifier 14 is disabled for the time indicated by the dotted lines 67a by a pulse, such as 34 in Fig. 1. The wave form 68c represents a pulse that arrives during the trailing edge of the suppressor pulse 24 generated by the generator 23 and serves to extend the time the amplifier 14 is suppressed, as shown by the dotted line 67b.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A beacon system comprising a receiver, means to produce an impulse of electrical energy upon receipt of a predetermined signal by said receiver, a transmitter of wave signals, means to cause said transmitter to emit a signal upon receiving such an impulse, a gating pulse generator controlled by said impulse, an associated radar system emitting a signal when active, a second gating pulse generator controlled by said radar impulse, means under control of the output of either of said pulse generators to prevent the output pulse of the receiver from causing said transmitter to emit a signal comprising a gated amplifier for said impulse comprising an electron discharge device having a cathode, a grid and a plate, a pair of uniconducting devices connected in series in opposing polarity with a resistor shunted by a capacitor between the grid and cathode of the said electron discharge device, one said device shunted by a resistor and the other said device shunted by a resistor and a source of biasing potential in series, means to couple the output of said receiver to the grid of said discharge device, and means to couple the output of said gating pulse generator to the junction of said uniconducting devices.

2. A gated amplifier comprising an electron discharge device having a cathode, a grid and a plate, a pair of uniconducting devices connected in series in opposing polarity with a resistor shunted by a capacitor between the grid and cathode of the said electron discharge device, one said device shunted by a resistor and the other said device shunted by a resistor and a source of negative biasing potential in series, means to couple a signal to the grid of said electron discharge device, and means to couple a gating pulse to the junction of said unidirectional conducting devices.

References Cited in the file of this patent

UNITED STATES PATENTS

| | | |
|---|---|---|
| 2,171,636 | Seeley | Sept. 5, 1939 |
| 2,427,191 | Brink | Sept. 9, 1947 |
| 2,453,970 | Charrier | Nov. 16, 1948 |
| 2,460,202 | Tyson | Jan. 25, 1949 |
| 2,530,096 | Sudman | Nov. 14, 1950 |
| 2,531,393 | Burnight et al. | Nov. 28, 1950 |
| 2,622,193 | Clayden | Dec. 16, 1952 |
| 2,632,845 | Goldberg | Mar. 24, 1953 |
| 2,653,237 | Johnstone et al. | Sept. 22, 1953 |